(12) United States Patent
Keshishi

(10) Patent No.: US 8,909,136 B1
(45) Date of Patent: Dec. 9, 2014

(54) REMOTE VALET PAGING ASSEMBLY

(71) Applicant: William Keshishi, Glendale, CA (US)

(72) Inventor: William Keshishi, Glendale, CA (US)

( * ) Notice: Subject to any disclaimer, the term of this patent is extended or adjusted under 35 U.S.C. 154(b) by 157 days.

(21) Appl. No.: 13/732,914

(22) Filed: Jan. 2, 2013

(51) Int. Cl.
*H04B 7/24* (2006.01)
*H04B 7/26* (2006.01)

(52) U.S. Cl.
CPC ......................................... *H04B 7/26* (2013.01)
USPC ...................... 455/39; 455/456.1; 340/539.11; 340/539.32

(58) Field of Classification Search
USPC ........ 455/39, 41.1, 66.1, 456.1, 456.3, 67.11, 455/226.1, 229, 345; 340/539.1, 539.11, 340/539.32, 426.1, 426.21, 988
See application file for complete search history.

(56) References Cited

U.S. PATENT DOCUMENTS

| | | |
|---|---|---|
| 5,335,246 A | 8/1994 | Yokev et al. |
| D388,089 S | 12/1997 | Komamiya et al. |
| 5,710,557 A | 1/1998 | Schuette |
| 6,097,106 A | 8/2000 | Roddy et al. |
| 6,262,656 B1 * | 7/2001 | Byrd et al. ................. 340/539.1 |
| 8,199,014 B1 * | 6/2012 | Kindeberg ................. 340/572.1 |
| 2009/0295568 A1 * | 12/2009 | Jamchi ..................... 340/539.11 |
| 2010/0090817 A1 | 4/2010 | Yamaguchi et al. |

* cited by examiner

Primary Examiner — Thanh Le

(57) ABSTRACT

A remote valet paging assembly includes a panel. A base processor is coupled to the panel. A charge port is coupled to the panel. The charge port is operationally coupled to the base processor. A base transceiver is coupled to the panel. The base transceiver is operationally coupled to the base processor. A base actuator is coupled to the panel. The base actuator is operationally coupled to the base processor so the base actuator may actuate the base processor. A pager is removably positionable in the charge port. The pager includes a remote processor coupled to the pager. A remote transceiver is coupled to the pager. The remote transceiver is operationally coupled to the remote processor. A remote actuator is coupled to the pager. The actuator is operationally coupled to the remote processor so the remote actuator may actuate the remote processor.

16 Claims, 5 Drawing Sheets

PATENT TEXT PAGE

REMOTE VALET PAGING ASSEMBLY

BACKGROUND OF THE DISCLOSURE

Field of the Disclosure

The disclosure relates to remote valet paging devices and more particularly pertains to a new remote valet paging device for remotely paging a valet.

SUMMARY OF THE DISCLOSURE

An embodiment of the disclosure meets the needs presented above by generally comprising a panel that has a front side and a back side. A base processor is coupled to the panel. A charge port is coupled to the panel. The charge port is operationally coupled to the base processor. A base transceiver is coupled to the panel. The base transceiver is operationally coupled to the base processor. A base actuator is coupled to the panel. The base actuator is operationally coupled to the base processor so the base actuator may actuate the base processor. A pager is removably positionable in the charge port so the pager is operationally coupled to the charge port. The pager includes a remote processor coupled to the pager. A remote transceiver is coupled to the pager. The remote transceiver is operationally coupled to the remote processor. A remote actuator is coupled to the pager. The actuator is operationally coupled to the remote processor so the remote actuator may actuate the remote processor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
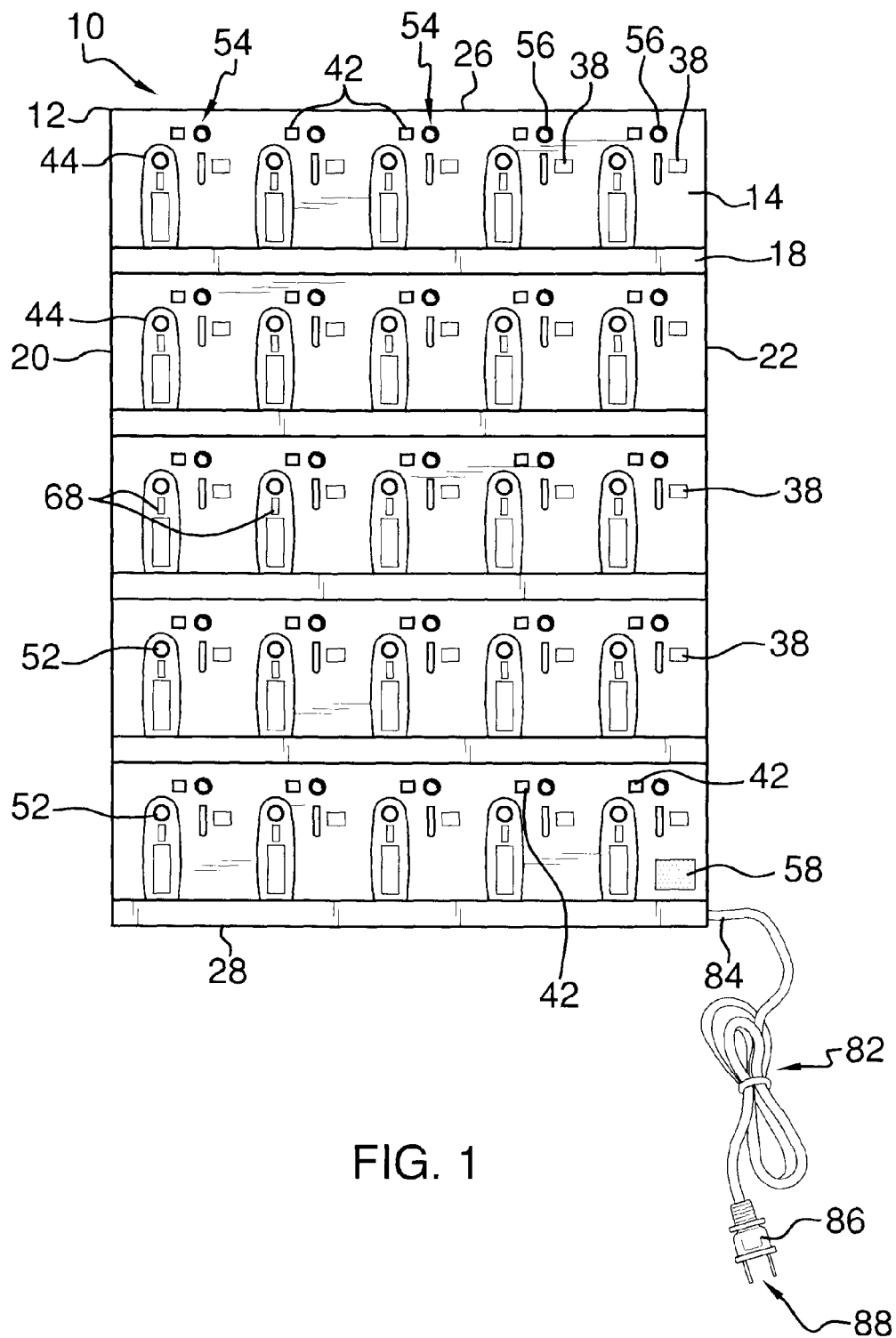
FIG. 1 is a front view of a remote valet paging assembly according to an embodiment of the disclosure.
Figure 2:
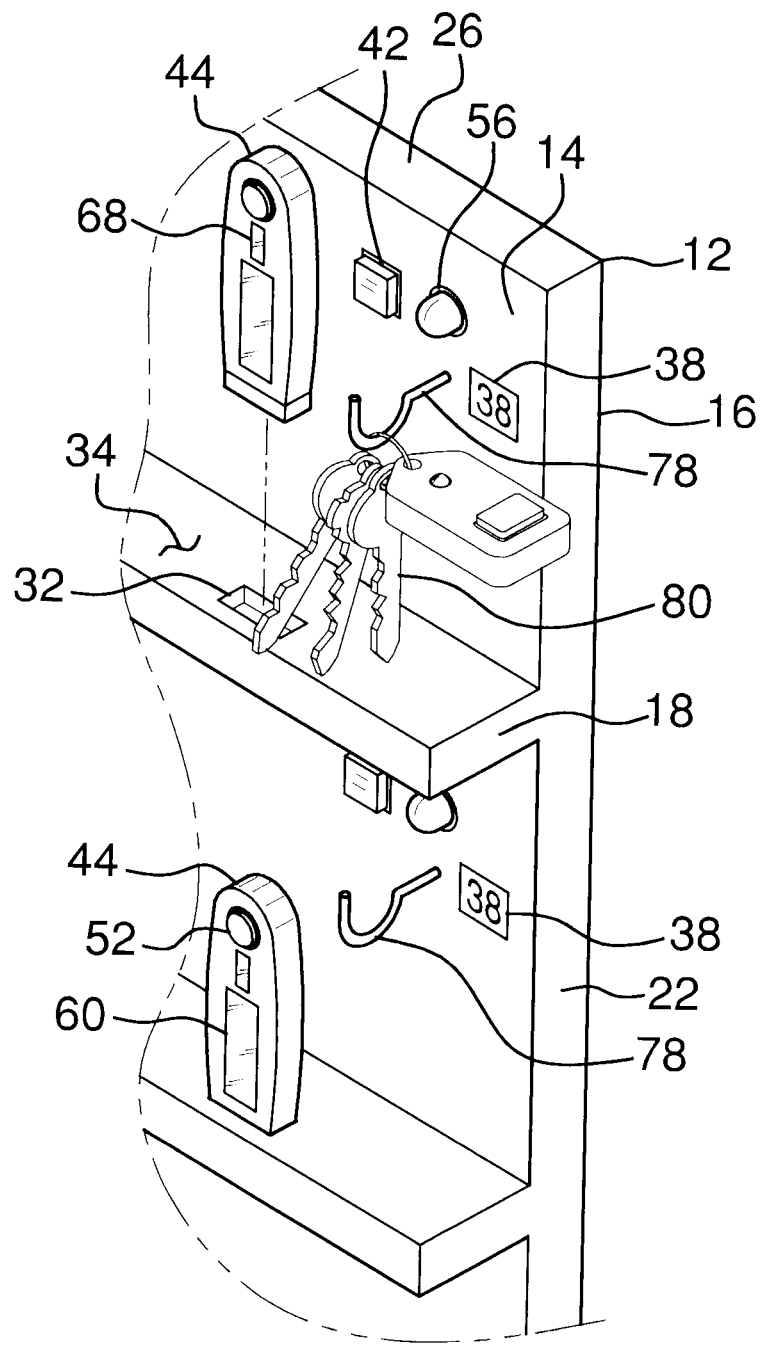
FIG. 2 is a cut away view of an embodiment of the disclosure.
Figure 3:
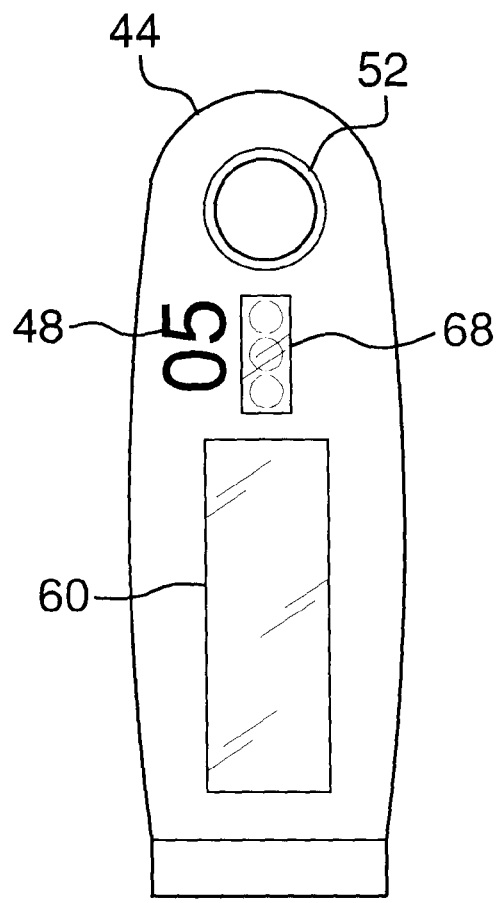
FIG. 3 is a front perspective view of an embodiment of the disclosure.
Figure 4:
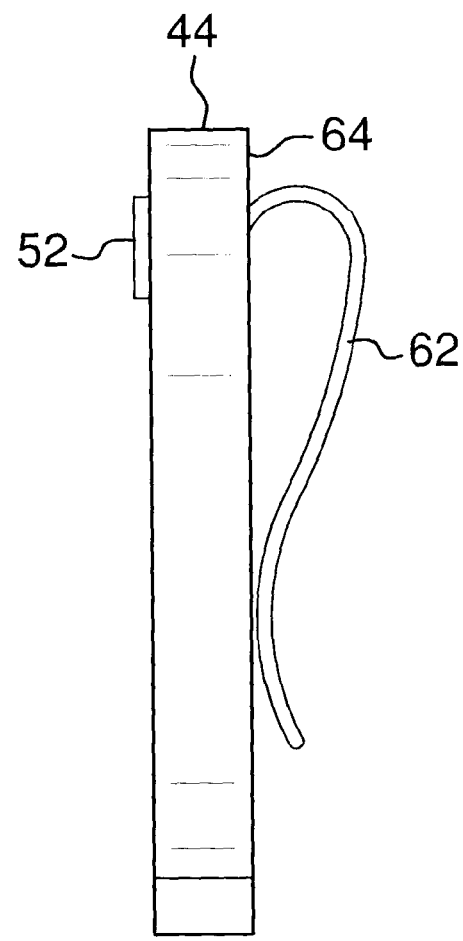
FIG. 4 is a right side view of an embodiment of the disclosure.
Figure 5:
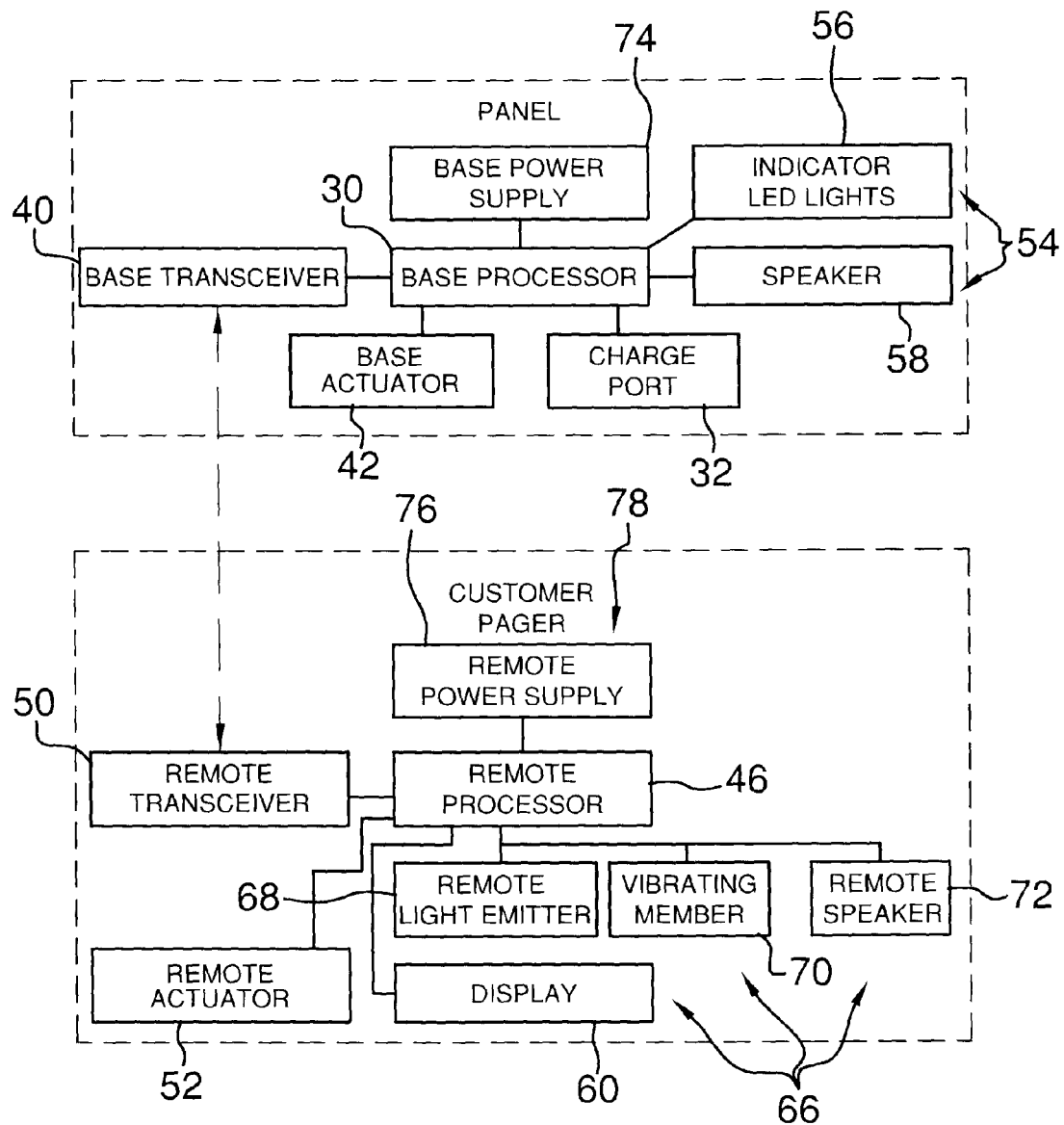
FIG. 5 is a schematic view of an embodiment of the disclosure.
Figure 6:
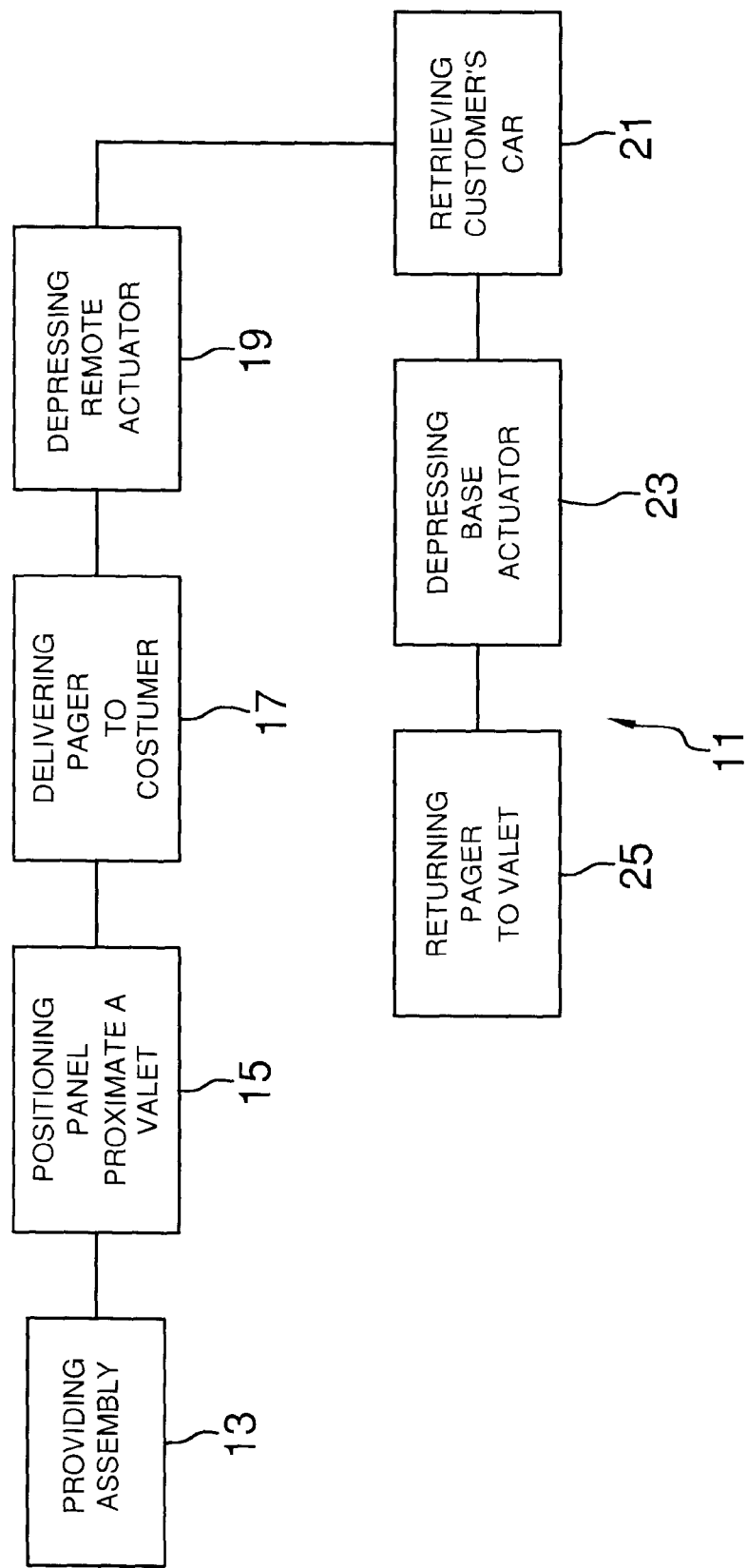
FIG. 6 is a schematic view of an embodiment of the disclosure.

With reference now to the drawings, and in particular to FIGS. 1 through 6 thereof, a new remote valet paging device embodying the principles and concepts of an embodiment of the disclosure and generally designated by the reference numeral 10 will be described.

As best illustrated in FIGS. 1 through 6, the remote valet paging assembly 10 generally comprises a panel 12 has a front side 14 and a back side 16. The panel 12 may have a height between 50 cm and 64 cm and a width between 35 cm and 40 cm. A shelf 18 is coupled to and extends forwardly from the front side 14 of the panel 12. The shelf 18 extends between a first lateral edge 20 and a second lateral edge 22 of the panel 12. The shelf 18 is one of a plurality of shelves 18. Each of the plurality of the shelves 18 is vertically spaced apart from each other such that the plurality of shelves 18 is distributed evenly between a top edge 26 and a bottom edge 28 of the panel. The shelves 18 may be spaced apart from each other a distance between 6.5 cm and 9 cm.

A base processor 30 is coupled to the panel 12. A charge port 32 is coupled to the panel 12. The charge port 32 is positioned on an upper surface 34 of the shelf 18 such that the charge port 32 extends downwardly into the shelf 18. The charge port 32 is electrically coupled to the base processor 30. The charge port 32 may have a depth between 0.5 cm and 1 cm. The charge port 32 is one of a plurality of the charge ports 32. The plurality of charge ports 32 is spaced along an entire length of the upper surface 34 of the shelf 18. The panel 12 may have a plurality of sequential numbers 38 printed on the front side 14 of the panel 12. Each of the sequential numbers 38 is assigned to an associated one of the plurality of charge ports 32.

A base transceiver 40 is coupled to the panel 12. The base transceiver 40 is electrically coupled to the base processor 30. The base transceiver 40 transmits a signal when the base processor 30 is actuated. The base transceiver 40 may be a wireless transceiver. The base transceiver 40 may transmit and receive an RF signal between 40 MHz and 46 MHz.

A base actuator 42 is coupled to the panel 12. The base actuator 42 is electrically coupled to the base processor 30 so the base actuator 42 may actuate the base processor 30. The base actuator 42 may be positioned on the front side 14 of the panel 12. The base actuator 42 is one of a plurality of the base actuators 42. The plurality of base actuators 42 each is positioned proximate an associated one of the plurality of the charge ports 32.

A pager 44 is removably positionable in the charge port 32 so the pager 44 is operationally coupled to the charge port 32. The pager 44 includes a remote processor 46 coupled to the pager 44. The pager 44 may have a height between 5 cm and 8 cm and a width between 1.5 cm and 2.5 cm. The pager 44 is one of a plurality of pagers 44. The plurality of pagers 44 each is removably positionable within an associated one of the plurality of the charge ports 32. Each of the pagers 44 may have an associated one of a plurality of sequential numbers 48 printed on the pager 44. The sequential numbers 48 on the pagers 44 correspond to an associated one of the sequential numbers 38 on the panel 12.

A remote transceiver 50 is coupled to the pager 44. The remote transceiver 50 is electrically coupled to the remote processor 46. The remote transceiver 50 transmits a signal when the remote processor 46 is actuated. The remote transceiver 50 may be a wireless transceiver. The remote transceiver 50 may transmit and receive an RF signal between 40 MHz and 46 MHz. The remote transceiver 50 receives a signal from the base transceiver 40 so the remote transceiver 50 may selectively actuate the remote processor 46 upon receiving the signal. The base transceiver 40 receives a signal from the remote transceiver 50 so the base transceiver 40 may selectively actuate the base processor 30 upon receiving the signal.

A remote actuator 52 is coupled to the pager 44. The remote actuator 52 is electrically coupled to the remote processor 46 so the remote actuator 52 may actuate the remote processor 46. The remote processor 46 may selectively actuate the remote transceiver 50 to transmit the signal to the base transceiver 40. The base processor 30 may selectively actuate the base transceiver 40 to transmit the signal to the remote transceiver 50.

A base signal reception indicator 54 is coupled to the panel 12. The base signal reception indicator 54 is electrically coupled to the base processor 30. The base signal indicator 54 provides an alert upon the base transceiver 40 receiving a signal from the remote transceiver 50. The alert may comprise a light emission or an audible alarm or both. The base signal reception indicator 54 may include a light emitter 56 coupled to the front side 14 of the panel 12 to generate the light emission for the alert. Additionally, the base signal reception indicator 54 may include a speaker 58 coupled to the panel 12 to generate the audible alarm for the alert. The light emitter 56 and the speaker 58 are each electrically coupled to the base processor 30. The base signal reception indicator 54 is one of a plurality of the base signal reception indicators 54. The plurality of base signal reception indicators 54 each is positioned proximate an associated one of the plurality of the base actuators 42.

A display 60 is coupled to the pager 44. The display 60 may be an LCD display of any conventional design. The display 60 is electrically coupled to the remote processor 46. The display 60 displays indicia. The indicia may comprise text instructions relating to a customer's vehicle. A clip 62 is coupled to a back 64 of the pager 44. The clip 62 may engage an article of clothing to retain the pager 44 on the article of clothing.

A remote signal reception indicator 66 is coupled to the pager 44. The remote signal reception indicator 66 is electrically coupled to the remote processor 46. The remote signal reception indicator 66 provides an alert upon the remote transceiver 50 receiving a signal from the base transceiver 40. The alert may comprise a light emission, a vibration, an audible alarm or indicia displayed on the display 60 or combination of each type of alert. A remote light emitter 68, a vibrating member 70 and a remote speaker 72 may each be coupled to the pager 44 and electrically coupled to the remote processor 46 to generate the light emission, vibration and audible alarm for the alert.

A base power supply 74 is coupled to the panel 12. The base power supply 74 is electrically coupled to the base processor 30 and the charge port 32. A remote power supply 76 is coupled to the pager 44. The remote power supply 76 is electrically coupled to the remote 46 processor. The remote power supply 76 may comprise at least one battery 78. The remote power supply 76 is electrically coupled to the charge port 32 when the pager 44 is positioned in the charge port 32 so the charge port 32 may charge the remote power supply 76.

A hook 78 coupled to the front side 14 of the panel 12. The hook 78 is positioned proximate the base actuator 42. The hook 78 may retain a set of car keys 80. The hook 78 is one of a plurality of hooks 78. Each of the plurality of the hooks 78 is positioned proximate an associated one of the plurality of the base actuators 42.

A cord 82 is coupled to the panel 12. A first end 84 of the cord 82 is electrically coupled to the base power supply 74. A second end 86 of the cord 82 comprises a male electrical plug 88 so the second end 86 of the cord 82 may be electrically coupled to a female electrical outlet.

In use, a method 11 of two-way communication between a valet and a customer comprises the step of providing 13 a panel 12 and a pager 44. The panel 12 includes a base actuator 42 and a base signal reception indicator 54. The pager 44 includes a remote actuator 52 and remote signal reception indicator 66. The pager 44 is removably coupled to the panel 12. The method 11 also includes the step of positioning 15 the panel 12 proximate the valet. The method 11 further includes the step of delivering 17 the pager 44 to a customer in exchange for the customer's car keys 80. The customer may retain the pager 44 while the valet parks the customer's car. The method 11 additionally includes the step of depressing 19 the remote actuator 52 on the pager 44. The customer may depress the remote actuator 52 so the base signal reception indicator 54 alerts the valet to retrieve the customer's car. The method 11 further includes the step of retrieving 21 the customer's parked car upon receiving the alert on the panel 12. The method 11 includes the step of depressing 23 the base actuator 42 on the panel 12 so the remote signal reception indicator 66 alerts the customer that the customer's car is ready to be picked up. The method 11 finally includes the step of the returning 25 the pager 44 to the valet when the customer arrives to enter the car.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A remote valet paging assembly comprising:
   a panel having a front side and a back side;
   a base processor coupled to said panel;
   a charge port coupled to said panel, said charge port being operationally coupled to said base processor;
   a base transceiver coupled to said panel, said base transceiver being operationally coupled to said base processor;
   a base actuator coupled to said panel, said base actuator being operationally coupled to said base processor whereby said base actuator is configured to actuate said base processor;
   a pager being removably positionable in said charge port whereby said pager is operationally coupled to said charge port, said pager including;
   a remote processor coupled to said pager;
   a remote transceiver coupled to said pager, said remote transceiver being operationally coupled to said remote processor; and
   a remote actuator coupled to said pager, said actuator being operationally coupled to said remote processor whereby said remote actuator is configured to actuate said remote processor.

2. The assembly according to claim 1, further including a shelf coupled to and extending forwardly from said front side of said panel, said shelf extending between a first lateral edge and a second lateral edge of said panel.

3. The assembly according to claim 2, further including said shelf being one of a plurality of said shelves, each of said plurality of said shelves being vertically spaced apart from each other such that said plurality of shelves are distributed evenly between a top edge and a bottom edge of said panel.

4. The assembly according to claim 1, further comprising:
a shelf coupled to and extending forwardly from said front side of said panel;
said charge port being positioned on an upper surface of said shelf such that said charge port extends downwardly into said shelf.

5. The assembly according to claim 4, further including said charge port being one of a plurality of said charge ports, said plurality of charge ports being spaced along an entire length of said upper surface of said shelf.

6. The assembly according to claim 1, further comprising:
said base transceiver being electrically coupled to said base processor, said base transceiver transmitting a signal when said base processor is actuated; and
said base transceiver receiving a signal from said remote transceiver whereby said base transceiver is configured to selectively actuate said base processor upon receiving the signal.

7. The assembly according to claim 1, further comprising:
said remote transceiver being electrically coupled to said remote processor, said remote transceiver transmitting a signal when said remote processor is actuated; and
said remote transceiver receiving a signal from said base transceiver whereby said remote transceiver is configured to selectively actuate said remote processor upon receiving the signal.

8. The assembly according to claim 1, further including a hook coupled to said front side of said panel, said hook being positioned proximate said base actuator, said hook being configured to retain a set of car keys.

9. The assembly according to claim 1, further comprising:
a base signal reception indicator coupled to said panel, said base signal reception indicator being electrically coupled to said base processor; and
said base signal indicator providing an alert upon said base transceiver receiving a signal from said remote transceiver.

10. The assembly according to claim 9, further including the alert comprising a light emission or an audible alarm or both.

11. The assembly according to claim 1, further comprising:
a remote signal reception indicator coupled to said pager, said remote signal reception indicator being electrically coupled to said remote processor; and
said remote signal reception indicator providing an alert upon said remote transceiver receiving a signal from said base transceiver.

12. The assembly according to claim 11, further comprising:
a display coupled to said pager, said display being electrically coupled to said remote processor, said display displaying indicia; and
the alert comprising a light emission or indicia displayed on said display or both.

13. The assembly according to claim 1, further comprising:
said charge port being one of a plurality of said charge ports;
a hook coupled to said front side of said panel;
a base signal reception indicator coupled to said panel;
said pager being one of a plurality of said pagers, said plurality of pagers each being removably positionable within an associated one of said plurality of said charge ports;
said base actuator being one of a plurality of said base actuators, said plurality of base actuators each being positioned proximate an associated one of said plurality of said charge ports;
said base signal reception indicator being one of a plurality of said base signal reception indicators, said plurality of base signal reception indicators each being positioned proximate an associated one of said plurality of said base actuators; and
said hook being one of a plurality of said hooks, each of said plurality of said hooks being positioned proximate an associated one of said plurality of said base actuators.

14. The assembly according to claim 1, further including a cord coupled to said panel, a first end of said cord being electrically coupled to said base power supply, a second end of said cord comprising a male electrical plug whereby said second end of said cord is configured to be electrically coupled to a female electrical outlet.

15. A remote valet paging assembly comprising:
a panel having a front side and a back side;
a shelf coupled to and extending forwardly from said front side of said panel, said shelf extending between a first lateral edge and a second lateral edge of said panel, said shelf being one of a plurality of said shelves, each of said plurality of said shelves being vertically spaced apart from each other such that said plurality of shelves are distributed evenly between a top edge and a bottom edge of said panel;
a base processor coupled to said panel;
a charge port coupled to said panel, said charge port being positioned on an upper surface of said shelf such that said charge port extends downwardly into said shelf, said charge port being electrically coupled to said base processor, said charge port being one of a plurality of said charge ports, said plurality of charge ports being spaced along an entire length of said upper surface of said shelf;
a base transceiver coupled to said panel, said base transceiver being electrically coupled to said base processor, said base transceiver transmitting a signal when said base processor is actuated;
a base actuator coupled to said panel, said base actuator being electrically coupled to said base processor whereby said base actuator is configured to actuate said base processor, said base actuator being one of a plurality of said base actuators, said plurality of base actuators each being positioned proximate an associated one of said plurality of said charge ports;
a pager being removably positionable in said charge port whereby said pager is operationally coupled to said charge port, said pager being one of a plurality of said pagers, said plurality of pagers each being removably positionable within an associated one of said plurality of said charge ports, said pager including;
a remote processor coupled to said pager,
a remote transceiver coupled to said pager, said remote transceiver being electrically coupled to said remote processor, said remote transceiver transmitting a signal when said remote processor is actuated, said remote transceiver receiving a signal from said base transceiver whereby said remote transceiver is configured to selectively actuate said remote processor upon receiving the signal, said base transceiver receiving a signal from said remote transceiver whereby said base transceiver is configured to selectively actuate said base processor upon receiving the signal;

a remote actuator coupled to said pager, said remote actuator being electrically coupled to said remote processor whereby said remote actuator is configured to actuate said remote processor;

a base signal reception indicator coupled to said panel, said base signal reception indicator being electrically coupled to said base processor, said base signal indicator providing an alert upon said base transceiver receiving a signal from said remote transceiver, the alert comprising a light emission or an audible alarm or both, said base signal reception indicator being one of a plurality of said base signal reception indicators, said plurality of base signal reception indicators each being positioned proximate an associated one of said plurality of said base actuators;

a display coupled to said pager, said display being electrically coupled to said remote processor, said display displaying indicia;

a remote signal reception indicator coupled to said pager, said remote signal reception indicator emitter being electrically coupled to said remote processor, said remote signal reception indicator providing an alert upon said remote transceiver receiving a signal from said base transceiver, the alert comprising a light emission or indicia displayed on said display or both;

a base power supply coupled to said panel, said base power supply being electrically coupled to said base processor and said charge port;

a remote power supply coupled to said pager, said remote power supply being electrically coupled to said remote processor, said remote power supply comprising at least one battery, said remote power supply being electrically coupled to said charge port when said pager is positioned in said charge port whereby said charge port is configured to charge said remote power supply;

a hook coupled to said front side of said panel, said hook being positioned proximate said base actuator, said hook being configured to retain a set of car keys, said hook being one of a plurality of said hooks, each of said plurality of said hooks being positioned proximate an associated one of said plurality of said base actuators; and a cord coupled to said panel, a first end of said cord being electrically coupled to said base power supply, a second end of said cord comprising a male electrical plug whereby said second end of said cord is configured to be electrically coupled to a female electrical outlet.

16. A method of two-way communication between a valet and a customer, the steps of the method comprising:

providing a panel and a pager, said panel including a base actuator and a base signal reception indicator, said pager including a remote actuator and remote signal reception indicator, said pager being removably coupled to said panel;

positioning said panel proximate the valet;

delivering said pager to a customer in exchange for the customer's car keys;

depressing said remote actuator on said pager whereby said base signal reception indicator alerts the valet;

retrieving a customer's parked car;

depressing said base actuator on said panel whereby said remote signal reception indicator alerts the customer; and returning said pager to the valet.

* * * * *